United States Patent [19]

Sinclair et al.

[11] 3,717,543
[45] Feb. 20, 1973

[54] LAMINATIONS OF POLYIMIDE FILMS TO LIKE FILMS AND/OR TO METAL FOILS

[75] Inventors: James R. Sinclair, Charlotte; Gordon Milburn Ellis, Jr., Matthews, both of N.C.

[73] Assignee: Rexham Corporation, New York, N.Y.

[22] Filed: Jan. 13, 1971

[21] Appl. No.: 106,251

Related U.S. Application Data

[63] Continuation-in-part of Ser. No. 868,292, Oct. 27, 1969, abandoned, which is a continuation-in-part of Ser. No. 571,520, Aug. 10, 1966, abandoned.

[52] U.S. Cl. .................161/186, 156/330, 161/227, 260/837 R, 260/901
[51] Int. Cl. .......B32b 15/20, B32b 27/38, H05k 1/00
[58] Field of Search..........260/837 R, 901; 156/330; 161/184, 186, 227, DIG. 7

[56] References Cited

UNITED STATES PATENTS

| | | | |
|---|---|---|---|
| 2,824,851 | 2/1958 | Hall | 260/837 R |
| 2,880,116 | 3/1959 | Alps et al. | 117/72 |
| 2,949,445 | 8/1960 | Blake | 260/86.1 |
| 3,011,909 | 12/1961 | Hart et al. | 161/186 X |
| 3,032,460 | 5/1962 | Chipman et al. | 161/186 X |
| 3,048,552 | 8/1962 | Fang | 260/837 X |
| 3,206,330 | 9/1965 | Chottiner | 117/218 |
| 3,440,215 | 4/1969 | Holub | 161/227 X |
| 3,454,421 | 7/1969 | Westbrook | 161/184 X |
| 3,465,058 | 9/1969 | McCarthy | 260/837 R |
| 3,466,347 | 9/1969 | Davis | 260/837 R |
| 3,486,934 | 12/1969 | Bond | 161/227 X |
| 3,676,566 | 7/1972 | McBride | 161/227 X |

*Primary Examiner*—Harold Ansher
*Attorney*—Mandeville & Schweitzer

[57] ABSTRACT

A high temperature polyimide film - metal foil laminate and the process for making same is disclosed. The laminate webs are jointed together by an acrylic-epoxy resin adhesive that has been found to be very resistant to delamination of the webs during high temperature applications. The epoxy component of the adhesive is of the low molecular weight epichlorohydrin bisphenol A type having an epoxide equivalent weight of less than 550. The epoxy component is present in a substantial excess in relation to the acrylic component of the adhesive.

13 Claims, 2 Drawing Figures

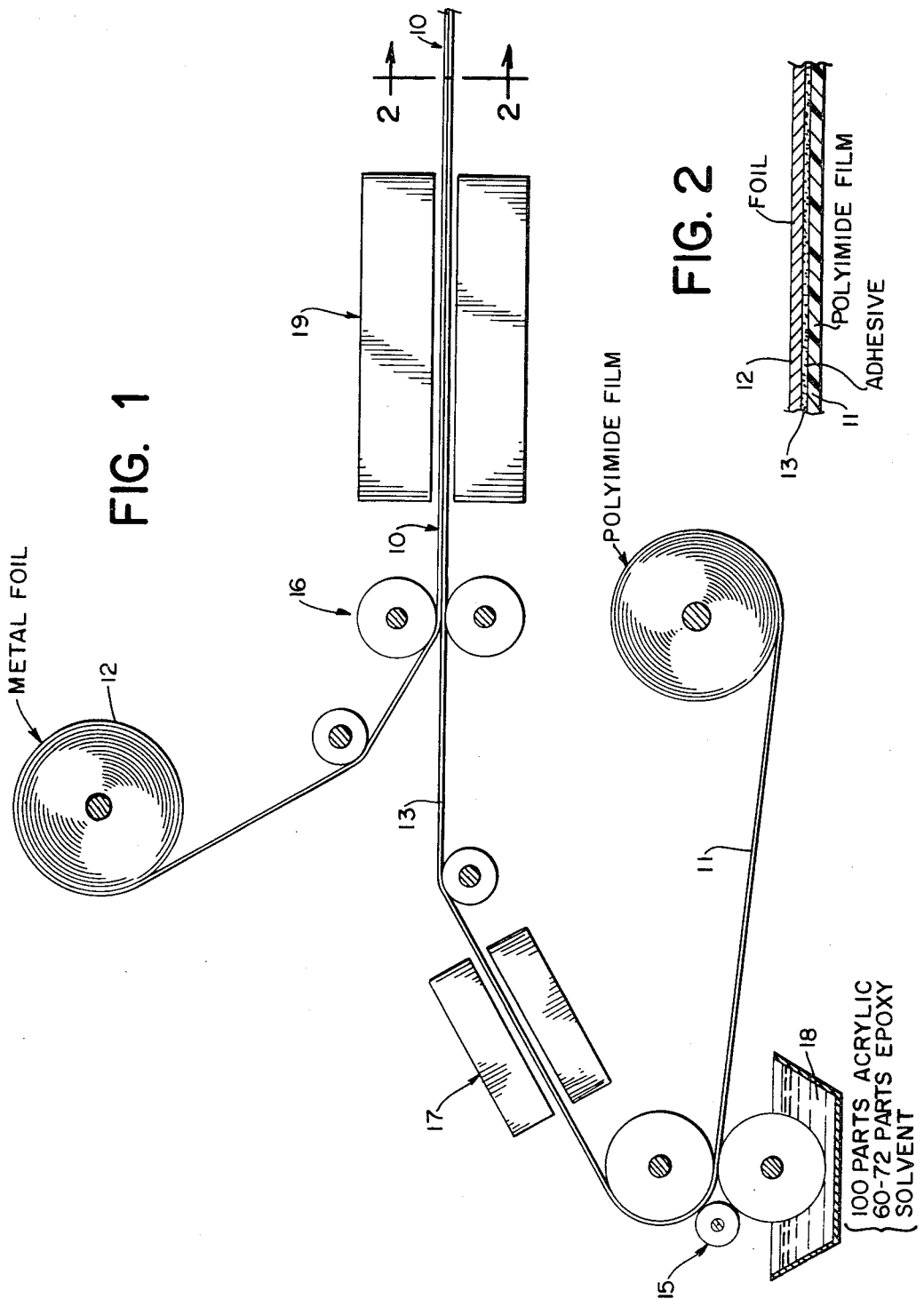

3,717,543

LAMINATIONS OF POLYIMIDE FILMS TO LIKE FILMS AND/OR TO METAL FOILS

Related Applications

This application is a continuation-in-part application of our copending application Ser. No. 868,292, filed Oct. 17, 1969, now abandoned, which, in turn, is a continuation-in-part of our application Ser. No. 571,520, filed Aug. 10, 1966, now abandoned.

Background and Summary of the Invention

The present invention relates to improvements in laminations of polyimide film to other polyimide film and/or to copper and other metal foil substrates; to new and improved methods of forming the same; and to improved adhesive compositions adapted for use in said methods.

Polyimide films have had a known desirability for utilization in connection with printed circuit laminations and the like because of the inherent high temperature stability of the polyimide material and its resistance to detrimental environmental conditions. However, its utilization for these purposes has been significantly restricted because of difficulties experienced in fabricating laminations of the polyimide film in a manner which would enable the advantageous characteristics of the polyimide material to be realized.

Polyimide film material does not melt at any temperature. Accordingly, the initial attempts to laminate the material by thermal techniques involved the production of the film with a combined layer of fluorinated ethylene polymer resin (du Pont Teflon FEP) to provide a heat sealable surface. However, the relatively high coefficient of thermal expansion of the Teflon resin and the significant degradation in the strength of the Teflon with increasing temperatures, particularly at temperatures exceeding the fairly low level of about 200°F., severly limited the usefulness of the Teflon coated product.

Subsequently, adhesive systems were developed for bonding polyimide film to polyimide film and/or to metal foils. However, while these known adhesive systems represented an improvement over the initial Teflon - polyimide approach, the bonding strengths of these adhesives were insufficient to utilize fully the properties of the polyimide film since these adhesives failed prior to the polyimide film and metal foils.

The present invention is directed to improvements in the laminating methods and laminated products of the prior art. The new and improved polyimide film lamination of the invention has vastly superior properties which make the new laminations especially well suited for the demanding requirements of sophisticated printed circuit applications. The improvements include the coating of a new and specially formulated adhesive composition to one web component of the lamination, and the subsequent formation on the web of a controlled residue of the new composition. Thereafter, the webs of the lamination are combined under heat and pressure.

Specifically, and as an important aspect of the invention, the new and improved adhesive composition is formulated of approximately 100 parts of an acrylic copolymer and 46–100 parts of an epoxy resin component (based on dry solids weights). Most advantageously, a small amount of a brominated epoxy resin is included in the formulation as a portion of the epoxy resin component.

Although it has been proposed heretofore to utilize an adhesive mixture including a combination of acrylic adhesive and epoxy resin, no such adhesive mixture has proved satisfactory for high temperature applications. However, it has been discovered, and it is a fundamental aspect of the invention, that improved laminate bonds are obtained by substantially and critically increasing the ratio of the weight of epoxy resin component to the weight of acrylic copolymer component employed in the adhesive composition, in comparison with the weight ratios of epoxy resin to acrylic copolymer employed heretofore. The increased epoxy component of the new adhesive provides a tackiness property to the adhesive residue after substantially all of the solvent is driven off, which tackiness results in a wetting out of the substrate web (a prerequisite for good bond formation) at the subsequent combination of the webs to form the new laminate. The wetting out of the substrate web (typically a metal foil such as copper) by the new adhesive aids in establishing an initial bond between the webs before final cure and results in a greatly improved laminated material. For example, a polyimide film-metal foil laminated product of the new method is capable of safely withstanding immersion in dip solder baths having temperature in excess of 500°F. for durations of up to 30 seconds, whereas prior art laminations of this type would be destroyed or severly damaged by similar harsh treatment.

Brief Description of the Drawing

For a more complete appreciation and understanding of the present invention and its attendant advantages, reference should be made to the following detailed description and accompanying drawing, in which:

FIG. 1 is a schematic representation of the method aspects of the invention; and FIG. 2 is an enlarged, fragmentary, cross-sectional view of the new and improved lamination of the invention.

Description of Preferred Embodiments

Referring to FIG. 1, the lamination 10 of the invention may be prepared in a continuous process by combining in a nip 16 a web of polyimide film 11 with a second web 12, which may be (depending upon the intended end use) either a second web of polyimide film or a web of metal foil, such as copper, aluminum, stainless steel, etc. Advantageously for printed circuit base material, rolled copper foil without a surface treatment is utilized for the second web 12, while the first web 11 is a so-called H-film, as commercially available at the time of the filing of this application under the trademark "Kapton" from E. I. du Pont de Nemours & Co., Wilmington, Del. As known to the art, the polyimide film 11 is prepared from a condensation reaction between an aromatic tetrabasic acid and an aromatic diamine, and a more complete description thereof is available in du Pont's Technical Information Bulletin H-1.

As one significant aspect of the invention, a new and improved laminating adhesive composition 13 is used to bond the metal foil 12 to the polyimide film substrate 11. The composition 13 is formulated from 100 parts (dry solids basis) of an ammoniated acrylic copolymer component, preferably of the methyl methacrylate-glycidyl methacrylate type, and 60–72 parts of epoxy resin component. Most advantageously, about 10 parts (dry solids basis) of the epoxy resin component of the new adhesive is a brominated high molecular weight epoxy resin.

A series of acrylic copolymers of the methyl methacrylate-glycidyl methacrylate type suitable for use in the adhesive formulation of the invention are disclosed in the Blake U.S. Pat. No. 2,949,445, the disclosure of which is incorporated herein by reference. Acrylic copolymers falling into this group are available from E. I. du Pont de Nemours & Co., under the trade designations "6850–6880".

Preferably, the epoxy resin component in the new adhesive formulation is of the epichlorohydrin bisphenol A type, or is a mixture of a number of resins of that type. Specifically, the epoxy resin component of the adhesive should be a liquid at application temperatures, and it should have a combined epoxide equivalent weight of not more than about 550. The epoxy component may include small amounts of epoxy resins of the required type having higher equivalent weights as long as the combined epoxide equivalent weight of the mixture is less than the prescribed value of 550.

A preferred epoxy resin for use in the new adhesive, either alone or with other epoxy resins, is available from the Shell Chemical Company under the trademark EPON 828. The resin EPON 828 is a low molecular weight epichlorohydrin bisphenol A type having an epoxide equivalent weight of 190. Preferably, the epoxy component may include up to about 30 percent by weight of a brominated high molecular weight epichlorhydrin bisphenol A type having an epoxide equivalent weight of about 500. A suitable brominated epoxy resin is available from the Dow Chemical Company under the trademark DER 511. The inclusion of the brominated epoxy resin reduces the brittleness of the cured adhesive; however, suitable adhesives for the practice of the invention have been formulated without its presence. For example, the EPON 828 epoxy resin as the sole ingredient of the epoxy resin component of the adhesive has proved highly satisfactory.

In accordance with an important aspect of the invention, the epoxy resin component of the new adhesive is present in a substantial excess of the minimum amount required for a complete reaction with the acrylic component of the adhesive. The invention provides for a ratio of epoxy equivalents to amine equivalents of at least 2.2 to 1 or greater, which ratio greatly exceeds the stoichiometric requirement for a complete reaction between these groups.

As a further aspect of the invention, a preferred acrylic copolymer for practice of the invention may be synthesized by reacting methyl methacrylate (97.2 parts) with glycidyl methacrylate (2.2 parts) to form a copolymer. The copolymer is then ammoniated with ethanol amine to provide a curing agent for the epoxy resin ingredients of the new adhesive formulation.

The preferred adhesive formulation of the invention is prepared by first dissolving about 100 parts (dry solids weight) of the preferred ammoniated acrylic copolymer in an appropriate hydrocarbon solvent such as toluene. About 60 parts of a low molecular weight epichlorohydrin bisphenol A type epoxy resin having an expoxide equivalent of about 190 and 10 parts of a brominated epoxy resin having a bromine content between about 18–20 percent and an epoxide equivalent weight of about 500 are then dissolved in the solvent mixture.

Referring to the drawing, the acrylic and epoxy components of the adhesive composition 13 are dissolved in the hydrocarbon solvent to form a solvent solution 18. The solvent solution 18 is then applied to the polyimide film 11 by a reverse roll coater 15 or by any other suitable coating apparatus such as a gravure coater or a cylinder coater, as shown in FIG. 1. The applied coating of adhesive composition is metered in order to limit the thickness of the residue of adhesive composition to approximately 0.4 to 1.0 mil upon subsequent solvent removal in dryers 17.

After removal of substantially all of the solvent from the adhesive coating in the dryers 17, the adhesive coated polyimide film 11, and the foil 12 are subjected to heat (approximately 300°–400°F.) and rolling pressure and are united at a combining nip 16 to establish the lamination 10. Thereafter, the lamination 10 is directed into a treatment oven 19 where it is subjected to a curing cycle of approximately 200°F. to 260°F. for about 16 hours.

An alternative method of producing the lamination 10 utilizes a platen press in lieu of the combining nip 16 and is characterized as a batch type rather than a continuous type of operation. The platens of the press are maintained at approximately 450°F., and the strata of the lamination are combined in the press under heat and pressure for 5 minutes. The curing cycle necessary in the continuous process is eliminated when the invention is practiced in this manner.

In accordance with the invention, the excess of epoxy resin component (beyond the stoichiometric minimum) of the new formulation functions to provide a tackiness to the adhesive after substantially all of the solvent is removed from the adhesive coating by the dryers 17. The tackiness of the adhesive coating after solvent removal is a very significant aspect of the invention in that it provides for wetting out of the metal foil substrate 12 when it is joined to the adhesive coated polyimide film web. The wetting out of the metal foil substrate 12 prior to the curing of the adhesive coating is believed to be a primary factor in the superior and advantageous high temperature integrity of the lamination 10.

It should be understood that in both the batch type and the continuous type of operations, the adhesive composition should be formulated in accordance with the invention to insure that the applied coating remains somewhat tacky when the two plies of the lamination are united after substantially all of the solvent is removed. The tackiness of the adhesive coating results in a wetting out of the substrate web without the presence of solvents which might ultimately be detrimental to the final product.

In accordance with the invention, the curing of the epoxy resins of the adhesive formulation does not take place until after the adhesive is solvent coated onto the polyimide film material. Specifically, the adhesive mixture is maintained in an unreacted state until after it is in intimate contact with the second web material (preferably copper foil) in the roller nip 16. The reaction between the acrylic copolymer component of the invention and the epoxy resins, i.e., the curing of the epoxy resins, is believed to take place by an epoxy amine mechanism.

The invention provides a method and an adhesive composition for producing a polyimide film-metal foil lamination that has excellent resistance to high temperature delamination. The high temperature integrity of the new laminate is a result of using the new adhesive formulation as a laminant and in producing the laminate in accordance with the method of the invention. The ability for the new adhesive to wet out the metal foil substrate and thereby permit solvent removal prior to the curing of the adhesive is of substantial significance in the production of laminates particularly for those intended for end uses in printed circuit applications.

We claim:

1. A method of forming a laminate of a first web of polyimide film and a second web, comprising the steps of
   a. supplying one of the webs to a coating station;
   b. applying to said one web from a solvent solution an adhesive coating having an ammoniated acrylic copolymer component and an epoxy component;
   c. said epoxy component being present in a substantial excess in relation to the quantity required to fully react with the acrylic copolymer;
   d. removing substantially all the solvent from said adhesive film;
   e. combining said adhesively coated web with the second web to form a lamination; and
   f. curing the adhesive coating by subjecting said lamination to elevated temperatures for a predetermined time.

2. The method of claim 1, wherein
   a. said curing step includes the application of heat and pressure simultaneously to the webs for a period of about 5 minutes.

3. The method of claim 2, wherein
   a. said heat and pressure are applied at about 450°F.

4. The method of claim 1, wherein
   a. said elevated temperatures are from about 200°F. to about 260°F.

5. The method of claim 4, wherein
   a. said predetermined time is approximately 16 hours.

6. The method of forming a polyimide film-metal foil laminate which includes the steps of
   a. supplying said polyimide film to a coating station;
   b. coating said polyimide web with an adhesive solvent solution containing a dry solids basis, 100 parts of an ammoniated acrylic copolymer and 46–100 parts of an epoxy resin;
   c. removing substantially all the solvent from said adhesive film;
   d. laminating the adhesive coated polyimide film to said metal foil;
   e. said laminating step including the chemical reaction of epoxy groups of said epoxy resin with the amine groups of said ammoniated acrylic copolymer.

7. The method of claim 6, wherein
   a. said chemical reaction is promoted by the exposure of the laminate to temperatures between about 200°F. and about 260°F. for about 16 hours.

8. The method of claim 6, wherein
   a. said chemical reaction is promoted by the exposure of the laminate to a temperature of about 450°F. for about 5 minutes.

9. A laminate structure having high temperature integrity comprising
   a. a layer of polyimide film, adhered to a
   b. substrate of metal foil by an
   c. intermediate layer of a cured adhesive composition;
   d. said cured adhesive comprising the reaction product of approximately 100 parts by weight of an ammoniated acrylic copolymer component and 46–100 parts by weight of an epoxy resin component having an epoxide equivalent weight of less than about 550;
   e. said adhesive composition having a substantial excess of epoxy reactive groups of at least 2.2 to 1 or greater for each reactive amine group of the said ammoniated acrylic copolymer component.

10. The laminate of claim 9, wherein
    a. said acrylic copolymer is a copolymer of methyl methacrylate and glycidyl methacrylate.

11. The laminate of claim 10, wherein
    a. said epoxy resin includes a low molecular weight epichlorohydrin bisphenol A type epoxy compound having an epoxide equivalent of about 190.

12. The laminate of claim 11, wherein
    a. said epoxy resin further includes a small amount of a brominated epoxy compound having an epoxide equivalent weight of about 500.

13. A laminate structure having high temperature integrity comprising
    a. a layer of polyimide film, adhered to a
    b. substrate of metal foil by an
    c. intermediate layer of a cured adhesive composition;
    d. said cured adhesive comprising the reaction product of an ammoniated acrylic copolymer component and an epoxy resin component having an epoxide equivalent weight of less than about 550;
    e. said epoxy resin component having an epoxy equivalent substantially greater than the amine equivalent of said ammoniated acrylic copolymer component.

* * * * *